United States Patent
Wehlen et al.

(10) Patent No.: US 11,585,432 B2
(45) Date of Patent: Feb. 21, 2023

(54) OIL SUPPLY ARRANGEMENT OF A VEHICLE WITH AN ELECTRIC MACHINE

(71) Applicant: ZF FRIEDRICHSHAFEN AG, Friedrichshafen (DE)

(72) Inventors: Timo Wehlen, Friedrichshafen (DE); Ingrid Reh, Friedrichshafen (DE); Ulrich Kerr, Tettnang (DE); Wolfgang Reiger, Friedrichshafen (DE); Stephan Scharr, Friedrichshafen (DE); Eckhardt Lübke, Friedrichshafen (DE); Marc Schieß, Hohenfels (DE); Florian Dichtl, Neukirchen vorm Wald (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 512 days.

(21) Appl. No.: 16/635,073

(22) PCT Filed: Jul. 2, 2018

(86) PCT No.: PCT/EP2018/067762
§ 371 (c)(1),
(2) Date: Jan. 29, 2020

(87) PCT Pub. No.: WO2019/025097
PCT Pub. Date: Feb. 7, 2019

(65) Prior Publication Data
US 2021/0180684 A1 Jun. 17, 2021

(30) Foreign Application Priority Data
Aug. 3, 2017 (DE) .................... 10 2017 213 513.1

(51) Int. Cl.
*H02K 5/20* (2006.01)
*F16H 57/04* (2010.01)
(Continued)

(52) U.S. Cl.
CPC ..... *F16H 57/0476* (2013.01); *F16H 57/0409* (2013.01); *H02K 5/203* (2021.01); *H02K 9/19* (2013.01); *B60K 2001/006* (2013.01)

(58) Field of Classification Search
CPC ............. F16H 57/0476; F16H 57/0409; B60K 2001/006; H02K 5/203; H02K 9/19
(Continued)

(56) References Cited

U.S. PATENT DOCUMENTS

2008/0128208 A1 6/2008 Ideshio et al.
2009/0107769 A1* 4/2009 Sato .................. B60K 6/365
184/106
(Continued)

FOREIGN PATENT DOCUMENTS

CN 103764423 4/2014
DE 102012112379 6/2014
(Continued)

OTHER PUBLICATIONS

Office Action of corresponding German Patent Application No. 10 2017 213 513.1.
(Continued)

*Primary Examiner* — Terrance L Kenerly
(74) *Attorney, Agent, or Firm* — Cozen O'Connor

(57) ABSTRACT

An oil supply arrangement of a vehicle with an electric machine in a housing with at least one oil volume connected to an oil volume of a transmission housing of the vehicle for oil supply. The oil volume of the electric machine is divided into at least two oil supply spaces to compensate an oil level in the housing. A first oil supply space is arranged at a side of the housing facing the driving direction of the vehicle and a second oil supply space is arranged at a side of the housing opposite the driving direction of the vehicle.

5 Claims, 1 Drawing Sheet

(51) Int. Cl.
*H02K 9/19* (2006.01)
*B60K 1/00* (2006.01)

(58) Field of Classification Search
USPC .......................................................... 184/13
See application file for complete search history.

(56) References Cited

U.S. PATENT DOCUMENTS

2014/0339934 A1    11/2014  Yoshiizumi et al.
2015/0258885 A1     9/2015  Ideshio et al.

FOREIGN PATENT DOCUMENTS

| | | |
|---|---|---|
| DE | 112013003975 | 7/2015 |
| DE |    2015000947 | 11/2016 |
| DE | 112012003064 | 3/2019 |
| JP |    2008132941 | 6/2008 |
| WO | WO 2015119052 | 8/2015 |

OTHER PUBLICATIONS

Office Action dated Aug. 2, 2022 issued in Chinese Patent Application No. 201880050666.4.

* cited by examiner

OIL SUPPLY ARRANGEMENT OF A VEHICLE WITH AN ELECTRIC MACHINE

CROSS REFERENCE TO RELATED APPLICATIONS

This is a U.S. national stage of Application No. PCT/EP2018/067762 filed Jul. 2, 2018. Priority is claimed on German Application No. DE 10 2017 213 513.1 filed Aug. 3, 2017 the content of which is incorporated herein by reference.

BACKGROUND OF THE INVENTION

1. Field of the Invention

The present invention is directed to an oil supply arrangement of a vehicle with an electric machine in a housing with at least one oil volume.

2. Description of Related Art

Hybrid vehicles or electrically driven vehicles in which an electric machine is provided in addition to an internal combustion engine or exclusively as drive, are known from automotive technology. The electric machine is arranged in a housing, which has an oil volume or oil wet space for lubricating and cooling. The housing of the electric machine is usually flanged to a transmission housing and is supplied with oil by the transmission housing.

When an electric machine is arranged in the oil volume, there is the risk that with an inclination of the vehicle or with acceleration the oil level in the oil volume will rise such that component parts of the electric machine that may not normally come in contact with the oil are immersed in the oil volume. For example, the rotor of the electric machine can be wetted by oil in an unwanted manner and oil can penetrate into the air gap between the rotor and stator, which disadvantageously increases the drag torque. Further, the oil can be heated such that oil additives that are not heat-resistant are destroyed.

In the horizontal or quasi-static operating condition of the vehicle, the oil level is adjusted to the lowest possible level so that the above-mentioned disadvantages are prevented. However, it must be ensured at the same time that the oil pump draws in oil when on a gradient, on an incline and during acceleration so that the cooling and lubricating function can be maintained. To this extent, the oil volume cannot be reduced in any desired manner.

A liquid-cooled electric motor is known, for example, from DE 11 2013 003 975 T5. In the electric motor, a coolant collecting receptacle is provided that is flanged to the underbody of the housing. This prevents the oil level from rising in an undesired manner during accelerations or on inclines. Oil suction is ensured at the same time because of the separate receptacle. However, it has been shown that additional installation space is needed for the receptacle arranged at the underbody of the housing, which increases the installation space requirement in a disadvantageous manner.

SUMMARY OF THE INVENTION

It is an object of one aspect of the present invention to provide an oil supply arrangement of the generic type described in the introduction in which an optimum oil supply is also ensured on an incline or during acceleration of the vehicle on one hand and which has the smallest possible installation space requirement on the other hand.

Accordingly, it is suggested that an oil supply arrangement of a vehicle with an electric machine in a housing with at least one oil volume is connected to an oil volume of a transmission housing for the oil supply. To ensure an optimum supply on an incline or during acceleration of the vehicle and, further, to take up as little installation space as possible, it is provided that the oil volume of the electric machine is divided into at least two oil supply spaces to compensate the oil level in the housing, and a first oil supply space is arranged at a side of the housing facing the driving direction of the vehicle and a second oil supply space is arranged at a side of the housing opposite the driving direction of the vehicle.

The oil supply spaces provided in the housing of the electric machine are connected to the oil volume of the transmission housing to compensate the oil level in the housing of the electric machine on the one hand and, on the other hand, are arranged in such a way that the oil level rising in the one oil supply space, for example, due to an inclination or acceleration of the vehicle, is compensated via the oil volume of the transmission housing with the oil level falling in the other oil supply space.

An arrangement that is particularly advantageous with respect to installation space can be achieved in that, for example, the first oil supply space and the second oil supply space extend parallel to the rotor axis of the electric machine in the housing. The rotor of the electric machine usually extends transverse to the longitudinal orientation of the vehicle so that the oil supply spaces ensure a compensation of the oil level during acceleration in longitudinal direction or inclination of the vehicle with respect to the longitudinal orientation. The supply spaces are preferably implemented inside of the existing interior of the housing.

For example, when the rotor axis is oriented transverse to the longitudinal direction of the vehicle, the oil supply spaces can be arranged laterally opposite one another below the rotor axis in each instance. In this way, a previously unused space, which does not entail any limitations with respect to the accommodation of the further components and which is also not critical as regards the road clearance of the vehicle can be utilized to form the oil supply spaces at the housing.

A particularly simple layout of the construction can be realized in the oil supply arrangement according to one aspect of the invention in that the first oil supply space and the second oil supply space extend, for example, over the entire width of the housing in a channel-like manner and are closed below the stator core. In this way, even when the vehicle is inclined and accelerating, it is ensured without expanding the housing at the bottom area that no oil can penetrate into the air gap of the electric machine.

Within the framework of an advantageous further development of one aspect of the present invention, it can be provided that the first oil supply space and the second oil supply space are fluidly connected to one another through a first end winding space of the electric machine and a second end winding space of the electric machine. When the vehicle is on an incline or during acceleration of the vehicle, a faster compensation of the oil level can be realized in this way directly via the two end winding spaces in the two oil supply spaces.

To realize a corresponding compensation of the oil level in the housing of the electric machine, for example, also when transverse forces occur due to transverse inclinations of the vehicle or transverse acceleration of the vehicle, it can be provided within the framework of a further development that one end winding space of the two end winding spaces is provided at the side of the housing opposite the transmission housing and one end winding space is provided at the side of the housing facing the transmission housing, and at least one of the end winding spaces is fluidly connected to the oil volume of the transmission housing to compensate the oil level.

BRIEF DESCRIPTION OF THE DRAWINGS

The present invention will be described further with reference to the drawings. The drawings show.

DETAILED DESCRIPTION OF THE PRESENTLY PREFERRED EMBODIMENTS

Figure 1:
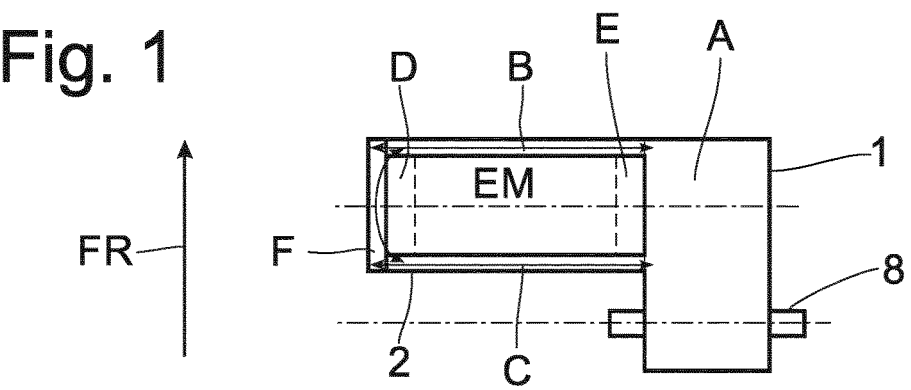
FIG. 1 is a schematic top view of the oil supply arrangement according to one aspect of the invention in a vehicle.
Figure 2:
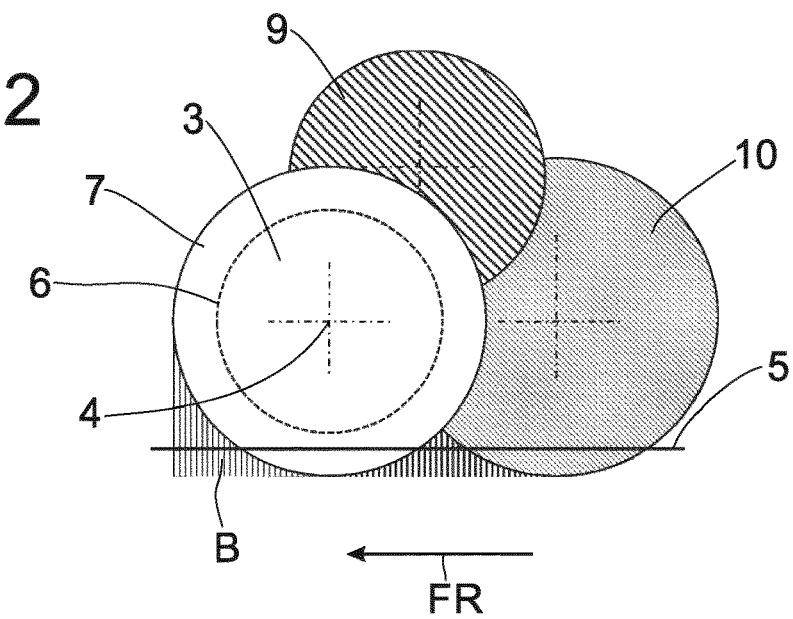
FIG. 2 is a schematic side view according to FIG. 1.
Figure 3:
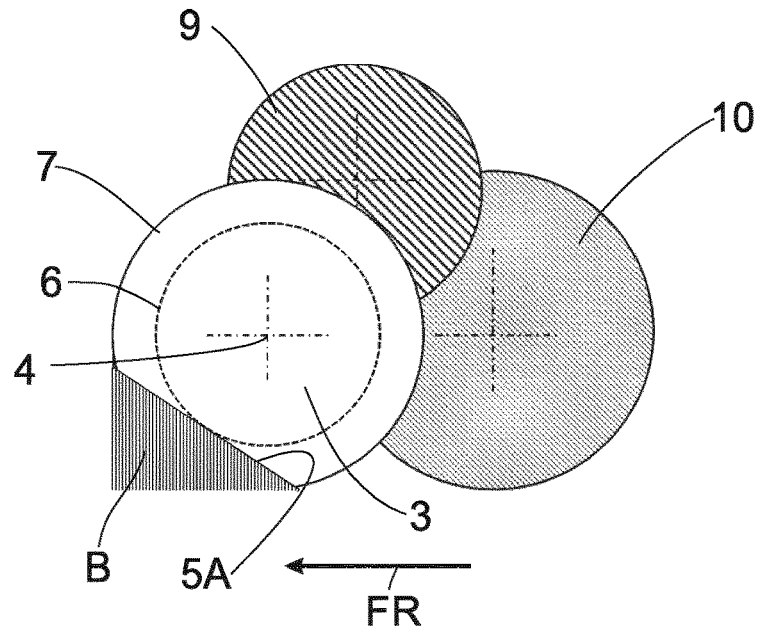
FIG. 3 is a schematic side view according to FIG. 1 during longitudinal inclination or longitudinal acceleration of the vehicle.

FIGS. 1 to 3 show different views of an oil supply arrangement in a vehicle, particularly an electric vehicle or hybrid vehicle, with an electrically driven axle by way of example.

The oil supply arrangement of a vehicle with an electric machine EM in a housing 2 according to one aspect of the invention comprises at least one oil volume that is connected to an oil volume A of a transmission housing 1 of the vehicle for supplying oil. In order to ensure a compensated oil level in the housing 2 also under external influences on the vehicle through acceleration or inclination, it is provided that the oil volume of the electric machine EM is divided into at least two oil supply spaces B, C so that a compensation of the oil level in the housings 1 and 2 is ensured under external influences. A first oil supply space B is preferably arranged at a side of the housing 2 facing the driving directions FR of the vehicle and a second oil supply space C of housing 2 is arranged at a side of housing 2 opposite the driving direction FR of the vehicle and opposite an output 8. The position of the oil supply spaces B, C is indicated by way of example in FIG. 1.

On an incline or during acceleration in direction of the first oil supply space B, the oil can escape at least partially into the second oil supply space C and/or into the oil volume A of the transmission housing 1, which is indicated by corresponding arrows in FIG. 1, so that the electric machine EM is less immersed in the existing oil. Correspondingly, the second oil supply space C acts in opposite direction. In this way, during an acceleration of the vehicle in or opposite the driving direction FR of the vehicle or during a corresponding inclination of the vehicle, a corresponding compensation is realized due to the provided oil supply spaces B, C so that the oil level does not rise above a predetermined level. The predetermined level is determined, for example, in such a way that oil cannot enter an air gap 6 between the rotor 3 and the electric machine EM between the rotor 3 and the stator 7.

When the first oil supply space B and the second oil supply space C are fluidly connected to one another through a first end winding space D of the electric machine EM and/or a second end winding space E of the electric machine EM, the compensation of the oil level can advantageously be carried out directly via the end winding spaces D, E without using the oil volume A in the transmission housing 1. In the embodiment example, a housing cover, which can form a housing cover space F of the electric machine EM, is provided as further space at the side of the housing 2 opposite the transmission housing 1. The housing cover space F forms a common space with the end winding space D located there. The end winding spaces D, E of the electric machine EM preferably extend transverse to rotor axis 4 or parallel to the longitudinal orientation of the vehicle.

To enable compensation when the vehicle is on an incline or is accelerating transverse to the longitudinal direction, the common space F, D formed from the housing cover space F and the end winding space D is connected to the first oil supply space B and to the second oil supply space C for compensating the oil level. During the inclination, the oil can flow through oil supply spaces B, C into the oil volume A of the transmission housing 1.

The resulting flows of oil through the provided oil channel connections of the oil supply arrangement according to one aspect of the invention during acceleration and inclination of the vehicle are indicated by way of example in FIG. 1 by corresponding arrows.

The double arrow along rotor axis 3 of electric machine EM is meant to indicate that an oil flow is realized between the transmission housing 1 and the housing 2 of the electric machine EM, particularly the transmission-side end winding space E. In this way, a fluid connection is provided between the oil supply spaces B, C, the end winding spaces D, E and the housing cover space F on the one hand and oil volume A of the transmission housing 1.

FIGS. 2 and 3 show, by way of example, a spur gear 9 at an intermediate shaft and a spur gear 10 at a driveshaft in the transmission housing 1. Further, the oil supply spaces B, C are shown in a side view from which it is clear that the oil supply spaces B, C extend parallel to the rotor axis 4 of the electric machine EM and transverse to the longitudinal orientation of the vehicle, respectively. In order to realize a corresponding compensation of the oil level, it is provided that the first oil supply space B and the second oil supply space C are arranged laterally opposite one another below the rotor axis 4. The first oil supply space B and the second oil supply space C extend, respectively, in a channel-shaped manner along the width of housing 2 and are closed below the stator core of the electric machine EM in housing 2. In this way, the oil supply spaces B, C are prevented from extending past the bottom area of housing 2 enabling a particularly advantageous arrangement with respect to installation space. In this way, an oil sump that is conventional in automatic transmissions and arranged at the base of the housing 2 and transmission housing 1 is advantageously eliminated.

FIG. 3 further shows a position of the vehicle inclined in longitudinal direction and an acceleration in driving direction FR in which there occurs, at most, an inclination of 35° of the oil level 5A in the oil supply spaces B, C, whereas FIG. 2 shows the oil level 5 in a static condition of the vehicle.

It is readily possible for the oil supply spaces B, C to comprise a common oil volume or two separate volumes.

Accordingly, the oil supply arrangement according to one aspect of the invention realizes a channel system particularly for electric drives or for hybrid drives with an electric machine EM arranged in the oil wet space, wherein it is ensured that no oil can wet the rotor 3 in an unwanted manner or can penetrate into the air gap in this way so that drag torques are not increased.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An oil supply arrangement of a vehicle comprising:
   a housing; and
   an electric machine arranged in the housing with at least one oil volume configured to be connected to an oil volume of a transmission housing of the vehicle for oil supply, a rotor of the electric machine extends transverse to a longitudinal orientation of the vehicle;
   wherein the oil volume of the electric machine is divided into at least two oil supply spaces to compensate an oil level in the housing, and
   wherein a first oil supply space is arranged at a side of the housing facing a driving direction of the vehicle and a second oil supply space is arranged at a side of the housing opposite the driving direction of the vehicle,
   wherein the first oil supply space and the second oil supply space extend parallel to a rotor axis of the electric machine, and,
   wherein the first oil supply space and the second oil supply space are arranged laterally opposite one another below a rotor axis of the electric machine.

2. The oil supply arrangement according to claim 1, wherein the first oil supply space and the second oil supply space extend over an entire width of the housing in a channel-like manner and are closed below a core of a stator of the electric machine in the housing.

3. The oil supply arrangement according to claim 1, wherein the first oil supply space and the second oil supply space are fluidly connected through at least one of:
   a first end winding space of the electric machine and
   a second end winding space of the electric machine,
   wherein the respective end winding spaces extend transverse to a rotor axis of the electric machine.

4. The oil supply arrangement according to claim 3, wherein one end winding space of the first and second end winding spaces is provided at a side of the housing opposite the transmission housing and one end winding space is provided at a side of the housing facing the transmission housing, wherein at least one of the end winding spaces is configured to be fluidly connected to the oil volume of the transmission housing to compensate the oil level.

5. The oil supply arrangement according to claim 1, wherein the first oil supply space and the second oil supply space are arranged laterally opposite one another below a rotor axis of the electric machine.

* * * * *